(12) United States Patent
Hashimoto et al.

(10) Patent No.: US 11,514,910 B2
(45) Date of Patent: Nov. 29, 2022

(54) INTERACTIVE SYSTEM

(71) Applicant: NTT DOCOMO, INC., Chiyoda-ku (JP)

(72) Inventors: Takanori Hashimoto, Chiyoda-ku (JP); Hiroshi Fujimoto, Chiyoda-ku (JP); Yuriko Ozaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 193 days.

(21) Appl. No.: 16/961,840

(22) PCT Filed: Dec. 27, 2018

(86) PCT No.: PCT/JP2018/048315
§ 371 (c)(1),
(2) Date: Jul. 13, 2020

(87) PCT Pub. No.: WO2019/146376
PCT Pub. Date: Aug. 1, 2019

(65) Prior Publication Data
US 2020/0357405 A1 Nov. 12, 2020

(30) Foreign Application Priority Data
Jan. 29, 2018 (JP) .............................. JP2018-012610

(51) Int. Cl.
*G10L 15/22* (2006.01)
*G06F 16/632* (2019.01)
*G10L 15/30* (2013.01)

(52) U.S. Cl.
CPC ............ *G10L 15/22* (2013.01); *G06F 16/632* (2019.01); *G10L 15/30* (2013.01); *G10L 2015/223* (2013.01)

(58) Field of Classification Search
USPC ..................................... 704/1–504, 231, 200
See application file for complete search history.

(56) References Cited

U.S. PATENT DOCUMENTS 6,400,996 B1 * 6/2002 Hoffberg ............... G06F 3/0482
700/86
6,728,345 B2 * 4/2004 Glowny ................. G11B 31/00
379/202.01
(Continued)

FOREIGN PATENT DOCUMENTS

JP 2015-36945 A 2/2015
JP 2018-92582 A 6/2018

OTHER PUBLICATIONS

Notice of Reasons for Refusal dated Jun. 29, 2021 in Japanese Patent Application No. 2019-567945 (with English language translation), 8 pages.
(Continued)

*Primary Examiner* — Marcus T Riley
(74) *Attorney, Agent, or Firm* — Oblon, McClelland, Maier & Neustadt, L.L.P.

(57) ABSTRACT

A server is an interactive system that performs the interaction by performing a reverse question with respect to an input by the user and providing response content. An input acquisition unit and an answer generation unit constitute an interaction execution unit that repeatedly performs the interaction until a question sentence and an answer, which are the response content, satisfy a prescribed condition. Further, the stoppage determination execution unit performs control for stopping the interaction performed by the input acquisition unit and the answer generation unit based on the interaction state by the user or the other user. In a case where the interaction is stopped, the output unit provides the question sentence and the answer thereof at the time of stoppage to the communication terminal.

20 Claims, 6 Drawing Sheets

(56) References Cited

U.S. PATENT DOCUMENTS

| | | | | |
|---|---|---|---|---|
| 6,785,369 | B2* | 8/2004 | Diamond | H04M 3/36 |
| 6,785,370 | B2* | 8/2004 | Glowny | H04M 3/42221 |
| 6,937,706 | B2* | 8/2005 | Bscheider | H04M 3/36 |
| 7,006,881 | B1* | 2/2006 | Hoffberg | G06V 40/103 |
| | | | | 709/200 |
| 7,418,391 | B2* | 8/2008 | Gayama | G06F 16/40 |
| | | | | 704/270.1 |
| 8,571,874 | B2* | 10/2013 | Yano | G10L 15/22 |
| | | | | 704/275 |
| 10,110,942 | B2* | 10/2018 | Lyons | H04N 21/2668 |
| 10,123,065 | B2* | 11/2018 | Lyons | H04N 21/47205 |
| 11,128,636 | B1* | 9/2021 | Jorasch | G06F 3/015 |
| 2003/0217160 | A1* | 11/2003 | Gayama | G06F 16/40 |
| | | | | 709/228 |
| 2008/0235017 | A1* | 9/2008 | Satomura | G10L 15/22 |
| | | | | 704/E15.04 |
| 2012/0179473 | A1* | 7/2012 | Yano | G10L 15/22 |
| | | | | 704/E21.001 |
| 2018/0158459 | A1* | 6/2018 | Yamagami | G06F 16/3344 |
| 2018/0188916 | A1* | 7/2018 | Lyons | G06F 3/0482 |
| 2018/0192108 | A1* | 7/2018 | Lyons | H04N 21/2668 |
| 2019/0037264 | A1* | 1/2019 | Lyons | G06F 3/0484 |
| 2019/0045252 | A1* | 2/2019 | Lyons | G06F 16/735 |
| 2020/0357405 | A1* | 11/2020 | Hashimoto | G10L 15/22 |
| 2022/0104694 | A1* | 4/2022 | Shelton, IV | A61B 34/37 |

OTHER PUBLICATIONS

English translation of the International Preliminary Report on Patentability and Written Opinion of the International Searching Authority dated Aug. 13, 2020 in PCT/JP2018/048315, 9 pages.
International Search Report dated Mar. 19, 2019 in PCT/JP2018/048315 filed on Dec. 27, 2018, 2 pages
Rieser et al., "Reinforcement Learning for Adaptive Dialogue Systems: A Data-driven Methodology for Dialogue Management and Natural Language Generation", Springer, 2011, pp. 53-70 (29 total pages).

* cited by examiner

*Fig.2*

INTERACTION STATE TABLE

| INPUT KEY LIST<br>(LIST OF FREE DESCRIPTION SENTENCES) | xxx、yyy |
|---|---|
| YES KEY LIST (LIST OF ACQUIRED KEYS) | zzz |
| NO KEY LIST (LIST OF DENIED KEYS) | vvv |
| SKIP KEY LIST (LIST OF SKIPPED KEYS) | www |
| Next QUESTION TYPE (KEY OR FAQ) | KEY |
| Next KEY (KEY TO BE ASKED NEXT) | aaa |
| Next FAQ (FAQ TO BE ASKED NEXT) | bbb |
| NUMBER OF REMAINING KEYS<br>(NUMBER OF RESIDUAL KEYS) | 50 |
| NUMBER OF REMAINING QUESTION SENTENCES<br>(NUMBER OF RESIDUAL QUESTION SENTENCES) | 30 |
| NUMBER OF REMAINING ANSWERS<br>(NUMBER OF REMAINING ANSWER CANDIDATES) | 20 |
| IMMEDIATELY BEFORE INPUT CONTENT | YES |
| IMMEDIATELY BEFORE OUTPUT TYPE<br>(KEY QUESTION, FAQ QUESTION,<br>RETURN TO UNCLEAR INPUT OR THE LIKE) | KEY |

Fig.3

HISTORY DATA TABLE

| SEARCH ID | INPUT KEY | YES | NO | STATUS |
|---|---|---|---|---|
| 1001 | A | BCDEF | | COMPLETE |
| 1002 | A | BCDEF | | COMPLETE |
| 1003 | A | BCEF | D | WITHDRAW |
| 1004 | A | BE | CDF | WITHDRAW |
| 1005 | A | BF | CDE | WITHDRAW |
| ... | | ... | | |
| 1101 | B | CD | | COMPLETE |
| 1102 | B | CDE | | COMPLETE |

INTERACTIVE SYSTEM

TECHNICAL FIELD

The present invention relates to an interactive system for performing a search in an interactive form.

BACKGROUND ART

Patent Literature 1 below discloses a technology for, in a case where a questioner selects a combination of a frequently asked question, which corresponds to a question described in a natural sentence, and an answer thereof from an FAQ and the number of searches is within a prescribed range, determining that narrowing down is appropriately performed, and selecting and outputting the answer with respect to the received question from the FAQ. On the other hand, a technology is disclosed for, in a case where it is difficult to select the answer because the number of searches is too small or too large, realizing effective narrowing down of the answer by outputting a related question, reverse question, or the like.

CITATION LIST

Patent Literature

[Patent Literature 1] Japanese Unexamined Patent Publication No. 2015-36945

SUMMARY OF INVENTION

Technical Problem

In the technology disclosed in Patent Literature 1, in a case where the number of reverse questions in an interactive format increases, the reverse question annoys the questioner, and thus it is conceivable that the questioner stops the search in the middle.

Here, in order to solve the above-described problem, an object of the present invention is to provide an interactive system that prevents a user from withdrawing in the middle of the search due to an increase in the number of interactions.

Solution to Problem

An interactive system according to the present invention is an interactive system that performs an interaction by performing a response to prompt an additional input of a user with respect to an input by the user and providing a response content, the interactive system including an interaction execution unit that repeatedly performs the interaction until a response content candidate, which is a candidate for the response content, satisfies a prescribed condition, an interaction stoppage unit that performs control for stopping the interaction by the interaction execution unit based on an interaction state by the user or another user, and a response content provision unit that provides the response content according to a time of stoppage in a case where the control for stopping the interaction is performed by the interaction stoppage unit.

According to the present invention, it is possible to perform the control for stopping the interaction based on the interaction state by the user or the other user. Therefore, it is possible to stop the interaction early according to the interaction state, and thus it is possible to reduce the user from withdrawing in the middle of the search.

Advantageous Effects of Invention

According to the present invention, it is possible to reduce the user from withdrawing in the middle of a search.

BRIEF DESCRIPTION OF DRAWINGS

FIG. 2 is a diagram illustrating a specific example of an interaction state database 105.

FIG. 3 is a diagram illustrating a specific example of a history database 106.

DESCRIPTION OF EMBODIMENTS

Figure 1:
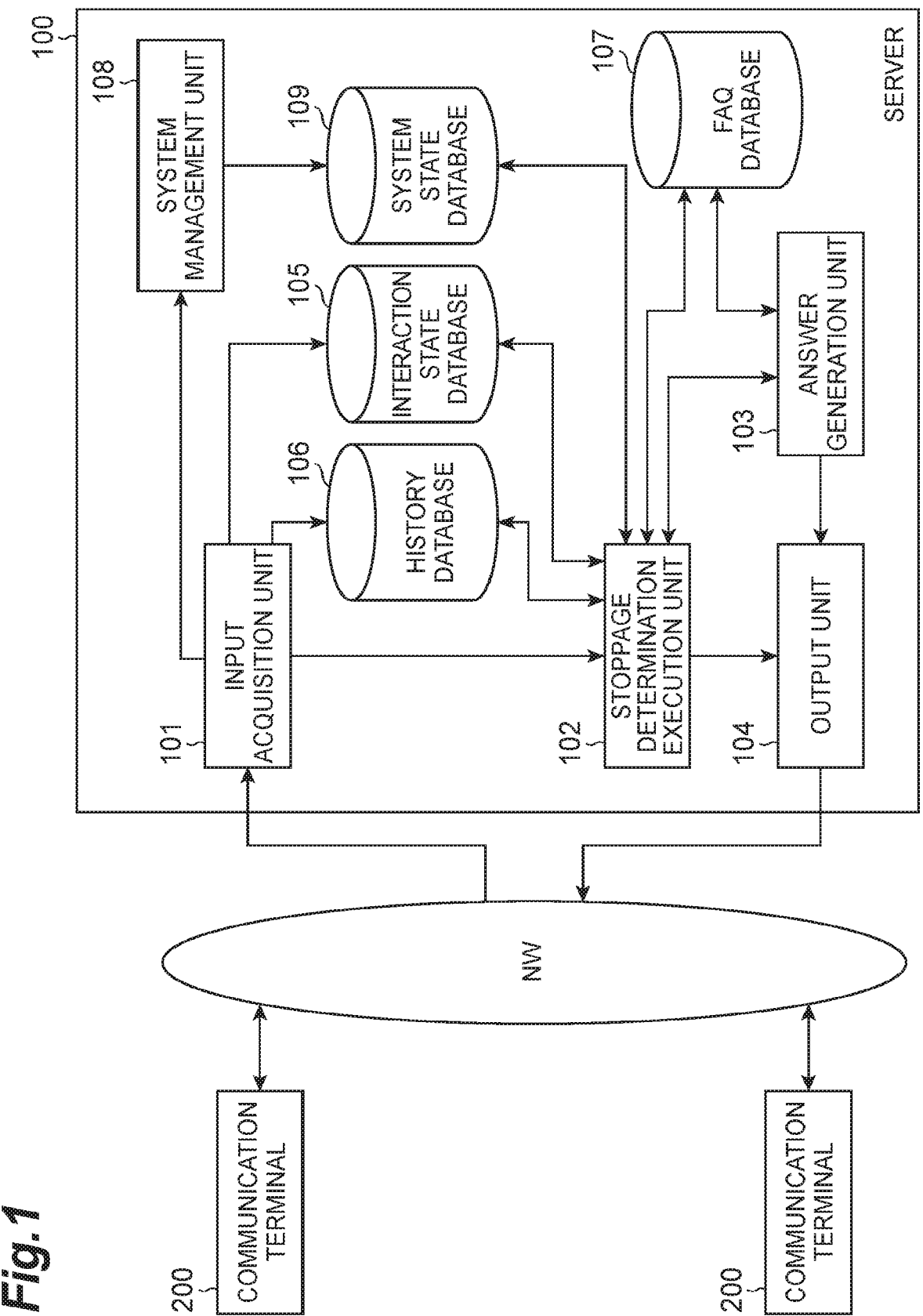
FIG. 1 is a diagram illustrating a functional configuration of a server 100 that is an interactive system according to an embodiment of the present disclosure.

An embodiment of the present disclosure will be described with reference to the accompanying drawings. In a possible case, the same components are denoted by the same reference numerals, and the description thereof will not be repeated.

FIG. 1 is a diagram illustrating a functional configuration of a server 100 that is an interactive system according to an embodiment of the present disclosure. As illustrated in FIG. 1, the server 100 includes an input acquisition unit 101 (interaction execution unit), a stoppage determination execution unit 102 (interaction stoppage unit, state determination unit), an answer generation unit 103 (interaction execution unit, response content extraction unit, response content provision unit), an output unit 104 (response content provision unit), an interaction state database 105 (interaction state storage unit), a history database 106 (interaction history storage unit), an FAQ database 107 (response content storage unit), a system management unit 108, and a system state database 109 (system state storage unit).

The server 100 is a so-called Frequently Asked Questions (FAQ) system, and is the interactive system that presents a relevant answer based on an input key input by a user. Since it is not normally possible to narrow down an answer with only one input key, the server 100 narrows down the answer by issuing a reverse question using a return key and asking a user whether or not to perform a search using the return key. Note that, in the present embodiment, although the answer includes a question sentence indicating content desired for the user to ask and an answer thereof, the answer may include only the question sentence. This interactive system is a device for simply checking and narrowing down an intention of the question input by the user. Note that, the key of the present embodiment indicates a keyword (word) unless otherwise specified.

A communication terminal 200 is a terminal operated by the user. The communication terminal 200 receives an input of the input key from the user, and transmits the input to the server 100. In addition, in a case where the communication terminal 200 receives the return key from the server 100, the communication terminal 200 presents the return key to the user and inquiries about an intention of whether or not to use the return key for the search. The communication terminal 200 receives a positive or negative intention with respect to the return key from the user, and transmits the intention to the server 100. The server 100 determines whether or not to use the return key for the search based on the positive or negative intention. That is, the server 100 determines whether the return key is a YES key or a NO key.

In addition, the intention may include a skip that is neither positive nor negative. Although the skip indicates of being not used as the return key, the skip does not indicate active denying. Note that, there is a difference in that, for a NO return key (NO key), a question sentence (and an answer) including the key is excluded from a subsequent search target, and, for a skipped return key, another return key is simply selected and a question sentence that includes the key is not excluded.

The server 100, which performs the above operation, further performs an operation of stopping the interaction according to a prescribed stoppage condition to prevent the user from withdrawing in the middle of the search due to an excessive increase in the number of interactions of the user, and presenting the question sentence and the answer thereof at a time point to the communication terminal 200 (user). Hereinafter, each configuration of the server 100 for performing the operation will be described with reference to FIG. 1.

The input acquisition unit 101 is a part that acquires intention information indicating the positive or negative intention with respect to the input key and the return key transmitted from the communication terminal 200. The input acquisition unit 101 stores the intention information of the input key and the return key acquired from the communication terminal 200 in the interaction state database 105.

In a case where the input key or the intention information is not received from the communication terminal 200 within a prescribed time after transmitting an immediately before return key, the input acquisition unit 101 determines that the user withdraws the interaction. In a case where it is determined that the user withdraws the interaction, the input acquisition unit 101 stores the input key and the YES/NO key described in the interaction state stored in the interaction state database 105 and a gist that the user withdraws (interruption of the interaction) in the database 106. Note that, it is preferable to separately store the interruption (or withdrawal) of the interaction and stop of the interaction. Although a response content candidate, such as a question sentence candidate, is not presented in a case where the interaction is interrupted, the response content, such as the question sentence, at the time point is presented in a case where the interaction is interrupted.

Note that, the input acquisition unit 101 may perform a process of acquiring and recognizing voice information in addition to acquiring text-based information.

The stoppage determination execution unit 102 is a part that determines whether to stop an interaction of the FAQ based on whether or not the information stored in the interaction state database 105 and the history database 106 satisfies the stoppage condition. In a case where the stoppage determination execution unit 102 determines to stop the interaction, the stoppage determination execution unit 102 performs control for stopping the interaction. The control for stopping the interaction indicates deciding one or a plurality of question sentences and answers thereof based on a prescribed condition, among question sentences extracted at a time of stoppage of the interaction, with respect to the answer generation unit 103, and presenting the question sentences and the answers thereof to the user. In addition, the control for stopping includes a process of adjusting various thresholds to present the question sentence with a small number of interactions rather than a normal time. The "normal time" is a state other than the time of stoppage of the interaction under the prescribed condition. The stopping of the interaction will be described in detail later.

The answer generation unit 103 is a part that searches the FAQ database 107 based on the intention information of the input key and the return key input by the input acquisition unit 101, and extracts the question sentence and the answer thereof. Further, in a case where the number of searched question sentences and the number of answers thereof is equal to or less than a prescribed value, the answer generation unit 103 determines that the search by the user is completed, and stores a gist that the search is completed in the history database 106 with the input key, and the YES/NO key.

In addition, in a case where the stoppage determination execution unit 102 performs determination of stopping the interaction, the answer generation unit 103 extracts the question sentence and the answer thereof at the time point, and selects the question sentence and the answer thereof to be presented to the user according to a stoppage condition of stopping the interaction.

In addition, in a case where it is determined that the question sentence and the answer thereof are not narrowed down according to the prescribed condition (here, equal to or less than the threshold), the answer generation unit 103 acquires the return key from the FAQ database 107. Further, the answer generation unit 103 continues the interaction by transmitting the return key to the communication terminal 200 through the output unit 104. Although there are various references for acquiring the return key, here, a search key to which a large number of question sentences are assigned in the FAQ database 107 is set as the return key.

The output unit 104 is a part that transmits the return key or the question sentence and the answer thereof to the communication terminal 200.

The interaction state database 105 is a storage unit that stores the interaction state of the user who is currently performing the interaction for each user. The interaction state includes the input key (including immediately before input content) acquired by the input acquisition unit 101 and the intention information (including the immediately before output type) of the return key. In addition, the interaction state includes a next question type based on the answer generated by the answer generation unit 103, a next key (or next FAQ), the number of remaining keys, the number of remaining question sentences, and the number of remaining answers. The interaction state is generated for each generation, that is, is generated and stored whenever an input process (reception of the input key, or the like) is performed.

FIG. 2 is a diagram illustrating a specific example of the interaction state database 105. As illustrated in FIG. 2, the interaction state database 105 stores an input key list, a YES key list, a NO key list, a SKIP key list, a Next question type, a Next key, a Next FAQ, the number of remaining keys, the number of remaining question sentences, the number of remaining answers, the immediately before input content, and the immediately before output type. The input key list is a key input as the input key, and a free description sentence is stored in a list format. Note that, input key list may be a keyword extracted from the free description sentence in a word unit. The YES key list is a key indicating an intention of YES with respect to the return key, and is stored in the list format. The NO key list is a key indicating an intention of NO with respect to the return key, and is stored in the list format. The SKIP key list is a key indicating an intention of skipping with respect to the return key, and is stored in the list format.

The next question type indicates any of type of the Next key or the Next FAQ. The Next key is a key set as the return key subsequent to one return key, and the Next FAQ is an item in which a question sentence (FAQ) is set as the return key subsequent to one return key. The Next question type is set by an operator of the server 100. Note that, there is a case where the next question type is determined according to a key acquisition condition. For example, in a case where the question sentence candidates are narrowed down to some extent, the Next FAQ is set as the next question type.

The number of remaining keys is the number of keys that is usable for the search. The FAQ database 107 stores the question sentence, the search keys, and the answers in association with each other. Although the question sentence is found using the input key and the return key, the number of remaining keys indicates the number of keys, which are not used for the search while the search is performed, in the FAQ database 107.

The number of remaining question sentences indicates the number of question sentences narrowed down based on the input key and the return key. The number of remaining answers indicates the number of answers corresponding to the question sentences. Although the answers are associated with the question sentences in the FAQ database 107, there is a case where the same answer is associated with different question sentences, and thus the number of remaining answers is not always the same as the number of remaining questions.

The immediately before input content is information input immediately before by the user, and is the intention information (YES/NO) with respect to the input key or the return key. The immediately before output type indicates any of the return key, the return FAQ, or return for an unknown input.

The history database 106 is a part that stores a past interaction state of the user and another user, and, more specifically, is a part that stores, for each user, the input key input by the user (including the other user) and a key according to the intention information. FIG. 3 is a diagram illustrating a specific example of the history database 106. As illustrated in FIG. 3, the history database 106 stores, for each user, the input key, the YES key, the NO key, and a status in association with each other. The YES key is a key that is intended to be positive in the return key, and the NO key is a key that is intended to be negative in the return key. The status indicates whether the question sentences are narrowed down to the end or the user withdraws in the middle based on the input key, the YES key, and the NO key. FIG. 3 illustrates that a search for a search ID: 1001 starts with an input key A and an interaction is performed in the order of YES keys B, C, D, . . . .

The FAQ database 107 is a database for performing an FAQ search, and is a database in which the search key, the question sentence, and answer thereof are associated with each other. Note that, although the search key is a key keyword (word) automatically extracted by performing morphological analysis or the like on the question sentence, the search key may be input by a designer of the FAQ database.

The system management unit 108 is a part that performs system management of the server 100. Specifically, the system management unit 108 acquires and manages information such as the number of simultaneous connections to the communication terminal 200 or the number of voice recognition cooperations. That is, the system management unit 108 is capable of grasping the number of simultaneous connections or a voice recognition process based on the operation of the input acquisition unit 101. In addition, the system management unit 108 manages a state (file writing, database updating, or the like) to the system based on the interaction state of the user.

The system state database 109 is a database that stores information indicating a load state of the server 100. For example, the system state database 109 describes information, such as the number of simultaneous connections to the communication terminal 200 or the number of voice recognition cooperations, under a management of the system management unit 108. In a case where the number of simultaneous connections with the communication terminal 200 increases, the load of the server 100 increases. In addition, a voice recognition cooperation process increases a load of the server 100 in a case where the voice recognition process is performed. The pieces of information are information decided based on the interaction state with the communication terminal 200, and indicate a kind of interaction state.

In addition, the system management unit 108 may manage the number of simultaneous connections to the same interactive system, and the system state database 109 may describe the number of simultaneous connections to the same interactive system. Usually, one server includes an interactive system (program: there is a case of being referred to as a chatbot) for a plurality of interactions. In addition, the voice recognition process may be performed by another system, and a state of cooperation with the system may be described.

Figure 4:
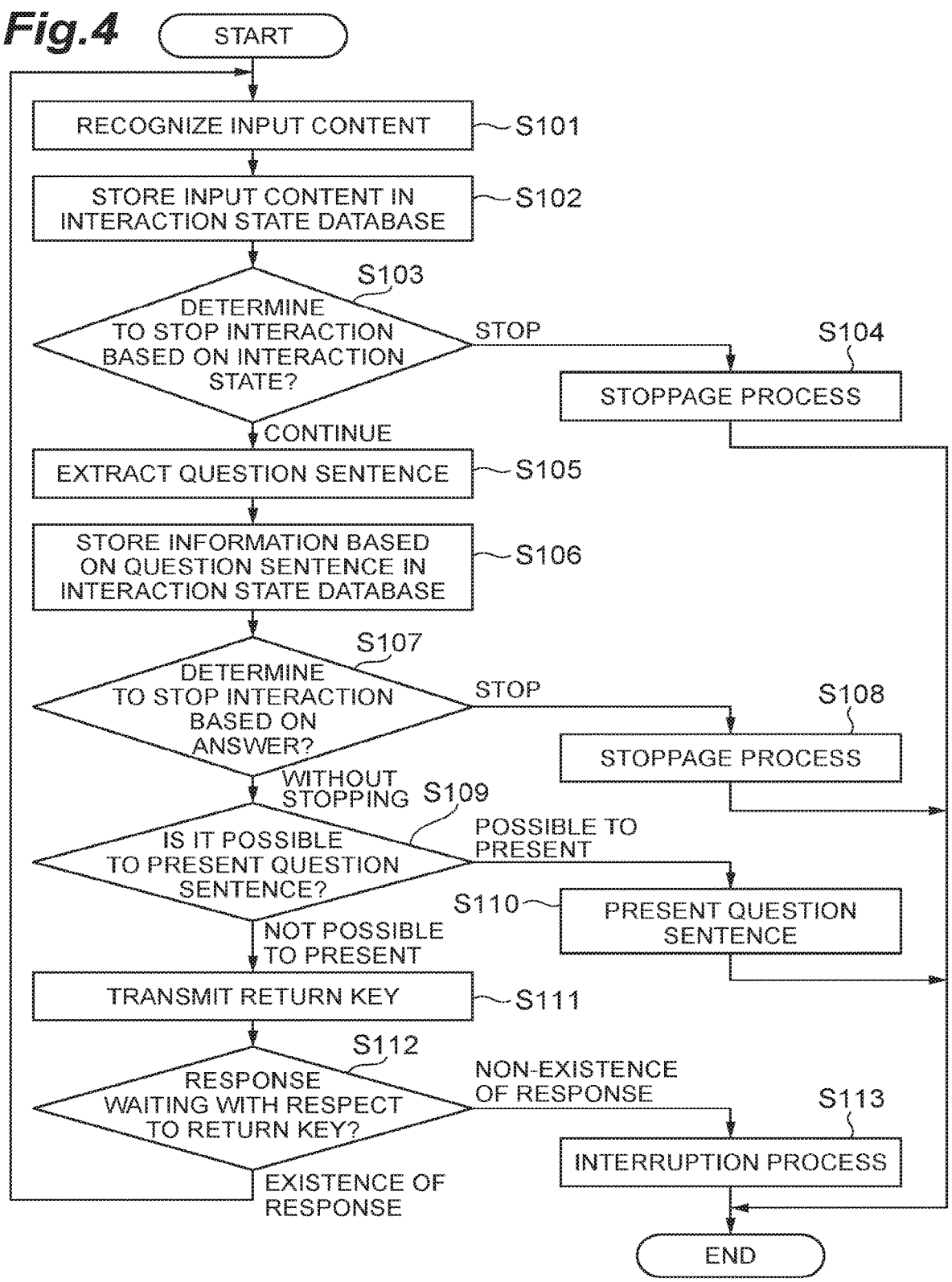
FIG. 4 is a flowchart illustrating an operation of the server 100.

Subsequently, an operation of the server 100 according to the embodiment of the present disclosure will be described. FIG. 4 is a flowchart illustrating the operation of the server 100. The input acquisition unit 101 recognizes the input content transmitted from the communication terminal 200 (S101). Specifically, the input acquisition unit 101 recognizes whether the input key is received or the intention information with respect to the return key is received. The input acquisition unit 101 stores the received information (the input key or the intention information) in the interaction state database 105 (S102).

The stoppage determination execution unit 102 determines whether or not to stop the interaction based on the interaction state of the interaction state database 105 and history information of the history database 106 (S103). Here, in a case where the stoppage determination execution unit 102 determines to stop the interaction, a process for stopping the interaction is performed (S104). The process for stopping the interaction is a process of extracting a question sentence obtained in a current interaction state from the FAQ database 107, extracting all of the question sentences or some of the question sentences further narrowed down based on the prescribed condition, and presenting the question sentences as the question sentence candidates and the answers thereof. Note that, not only a stoppage process is performed immediately, but also control for ending the interaction early may be performed by determining an upper limit of the number of interactions.

In a case where the stoppage determination execution unit 102 determines to not stop the interaction, the answer generation unit 103 refers to the FAQ database 107 using the interaction state of the interaction state database 105 and extracts the question sentence (S105). The answer generation unit 103 stores information based on the extracted question sentence in the interaction state database 105

(S106). Here, the Next key, the Next FAQ, the number of remaining keys, the number of remaining question sentences, and the number of remaining answers are stored. In a case where the question sentence is extracted from the FAQ database 107, the answer generation unit 103 understands the Next key to be used as the return key or the Next FAQ, and is also capable of acquiring the information such as the number of remaining keys.

Next, the stoppage determination execution unit 102 determines whether or not to stop the interaction based on the interaction state stored in S106 (S107). That is, the stoppage determination execution unit 102 determines whether or not to stop the interaction based on at least one of the number of remaining keys, the number of remaining question sentences, and the number of remaining answers. For example, in a case where the number of remaining question sentences or the number of remaining answers is large (in a case where of being equal to or larger than a prescribed value), a large number of interactions are still required to narrow down the number of question sentences and the like, and thus there is a high probability that the user withdraws in the middle. In the case, it may be determined to stop the interaction. In addition, even in a case where a reduction ratio or the number of reductions in the number of remaining immediately before question sentences or the number of remaining answers is small, it is possible to similarly determine that it is not meaningful to continue, and thus it may be determined to stop the interaction in the case.

In a case where the stoppage determination execution unit 102 determines to stop the interaction, the stoppage process is performed (S108). The stoppage process is the same as above, and includes general control for stopping.

In a case where the stoppage determination execution unit 102 determines to not stop the interaction, the answer generation unit 103 determines whether or not it is possible to present the question sentence extracted in S105 (S109). That is, the answer generation unit 103 determines that it is possible to present the question sentence in a case where the prescribed condition is satisfied as in a case where the number of extracted question sentence candidates is equal to or less than a prescribed number.

In a case where it is determined that it is possible to present the question sentence, the answer generation unit 103 outputs the question sentence and the answer thereof, as the question sentence candidate, to the communication terminal 200 through the output unit 104, and the question sentence and the answer thereof are presented in the communication terminal 200 (S110). Note that, for convenience, although the process ends after S110 in the drawing, the process is not limited thereto. For example, after the question sentence is presented, the output unit 104 may transmit a check message "Do you satisfy the answer?" to the communication terminal 200. Here, in a case where the user of the communication terminal 200 indicates a negative intention, the process may proceed to S111. Further, in a case where the question sentence presented in S110 is denied a plurality of times or continuously, the interaction may be stopped. In addition, the answer generation unit 103 may stop the interaction in a case where a plurality of question sentences are denied, and, at this time, may return the plurality of question sentences at once, or may generate and transmit an answer page in which the plurality of question sentences are collected.

In a case where it is determined that it is not possible to present the question sentence, the answer generation unit 103 refers to the FAQ database 107 (or the interaction state database 105), extracts a search key to be asked next, and transmits the extracted search key, as the return key, to the communication terminal 200 through the output unit 104 (S111).

The input acquisition unit 101 waits for a response with respect to the return key (S112), and performs an interruption process in a case where no response is received within a prescribed time (S113).

In a case where the input acquisition unit 101 receives the response with to the return key, the process returns to S101, the input acquisition unit 101 performs a process of recognizing the input content, and the processes in S101 to S112 are repeated.

As above, the server 100 is capable of determining to stop the interaction based on the interaction state of the interaction state database 105.

Next, the process (S103 and S107) of determining to stop the interaction based on the interaction state of the user or the other user, such as the history information of the interaction state database 105 and the history database 106, will be described in detail.

(Determination in S103)

The stoppage determination execution unit 102 determines whether or not it is necessary to stop the interaction based on the interaction state stored in the interaction state database 105. Specifically, in a case where the keys described in the NO key list are continuous to be equal to or larger than a reference value (continuous reference) in the interaction state, the stoppage determination execution unit 102 determines to stop the interaction. A reason for this is that the user tends to withdraw from the interaction in the middle in a case where the negative intentions are continuous with respect to the return key.

Note that, in a case where the keys described in the YES key list are continuous to be equal to or larger than the reference value, the reference value may be adjusted such that the interaction is not stopped early. Here, the reference value is a value decided separately from the reference with respect to the NO key.

In addition, the stoppage determination execution unit 102 may calculate a YES rate/NO rate from the YES/NO keys stored in the interaction state database 105, and may perform control for stopping the interaction based on each rate.

Figure 5:
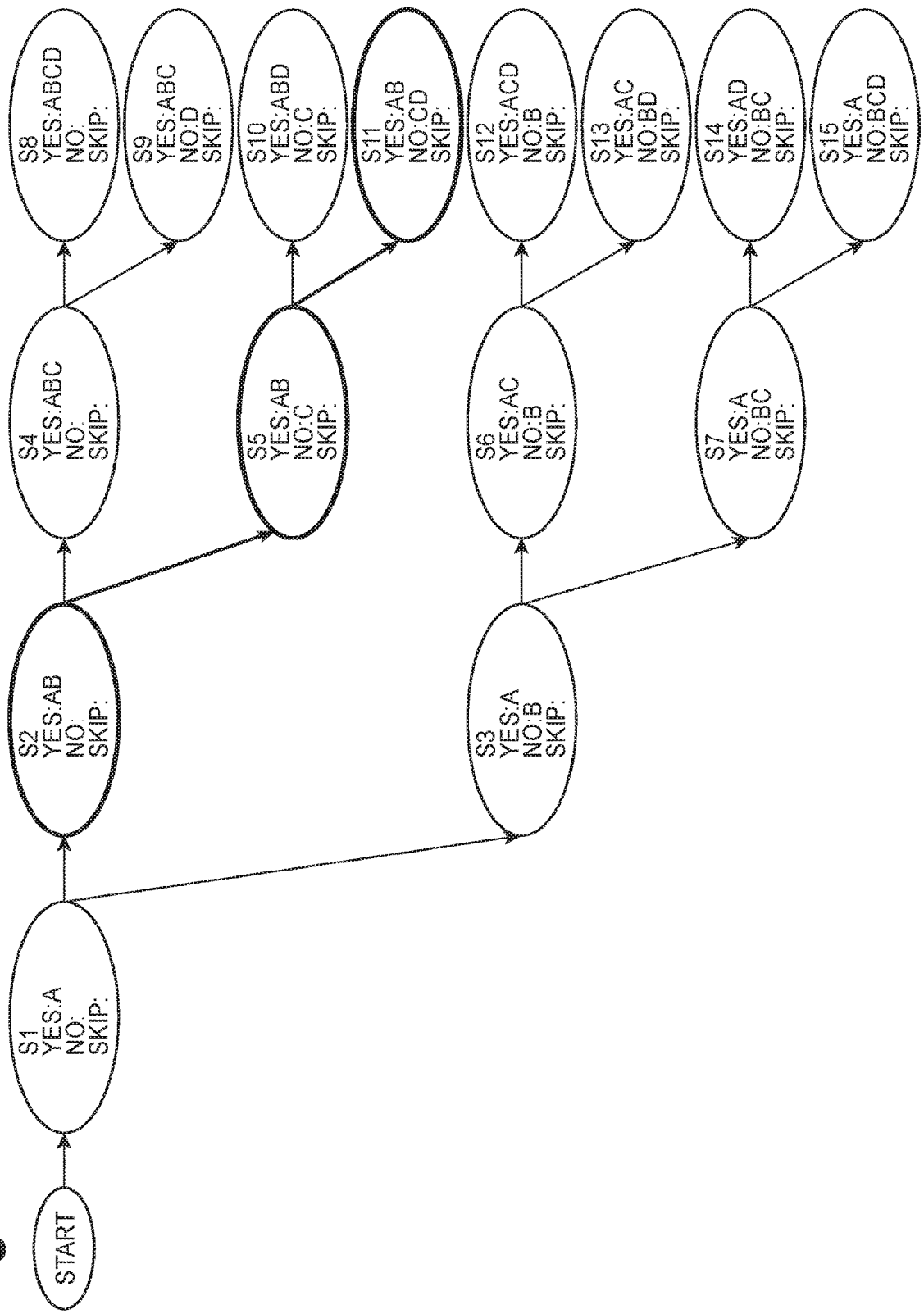
FIG. 5 is a diagram illustrating a schematic diagram of an interaction hi story.

In addition, the stoppage determination execution unit 102 may determine to stop the interaction based on the history database 106. FIG. 5 shows a schematic diagram illustrating the interaction history. The schematic diagram represents all patterns of YES/NO with respect to return keys A to D. Note that, SKIP will not be described for convenience of description.

As illustrated in FIG. 5, a process starts from start, and the return key A: YES is input in S1. Thereafter, in S2, the return key B: YES is input. On the other hand, in S3, the return key C: NO is input. Similar processes are performed from S4 to S15, and, a combination of YES/NO with respect to the return keys A, B, C, and D is illustrated in S8 to S15.

Here, in a search path of S1-S2-S5-S11, it is assumed that statistical information is acquired which indicates that the user withdraws without performing search to the end as a result in many histories. For example, the statistical information indicates that 50 people withdraws among 100 people.

In a case where the input content of the user passes through the path, there are many cases where it is preferable to stop the interaction at the time point without further transmitting the return key after the return key D.

On the other hand, in a path of S1-S2-S4-S8, it is assumed that the user is capable of searching to the end in many histories as a result. For example, the statistical information indicates that 10 people withdraw among 100 people. In a case of passing through the path, it is necessary to further transmit a return key after the return key D, and thus the process is continued and the interaction is not stopped.

As described above, based on the history data, in a case of passing through the search path in which there is a tendency to withdraw the interaction for the search in the middle, the interaction is stopped in the middle, and thus it is possible to cause the user to perform the search to the end without imposing excessive burdens on the user. A reference value (withdrawal reference rate) is set, and it is determined whether or not there is a tendency to withdraw based on the reference value. In a case where the withdrawal reference rate is set to 50%, the interaction is stopped in the middle on the search path in which 50% of users withdraw. The withdrawal reference rate may be changed according to an input state of the user as will be described later.

Note that, in a case where the same path is used in the middle even though an initial search path is different, the interaction may be stopped. The number of withdrawals or a withdrawal rate may be calculated in a case where the same search path is used in the middle even though the initial search path is different, and it may be determined to stop the interaction based on the calculation.

The specific process is as follows. The stoppage determination execution unit 102 refers to the history database 106. As illustrated in FIG. 3, in the history database 106, a return key with a response of YES, a return key with a response of NO, and an input key are described in association with each other, and, further, it is described whether or not the search is completed or withdrawn for each search as a status.

The stoppage determination execution unit 102 refers to the history database 106 in advance, and decides an interaction of a search, which passes through a certain path and is in a tendency to be withdrawn, by calculating the statistical information. As described above, it is assumed that the search path, which is equal to or larger than the withdrawal reference rate, is in the tendency to be withdrawn.

Further, the stoppage determination execution unit 102 refers to the interaction state database 105, and determines to stop the interaction for the search in a case where the search path, indicated by the YES key list and the NO key list described in the interaction state database 105, is the same as a search path in the tendency to be withdrawn, the search path being calculated in advance.

In this manner, it is possible to determine to stop the interaction based on the history data.

(Determination in S107)

In a case where the number of remaining keys, the number of remaining question sentences, and the number of remaining answers in the interaction state are equal to or larger than the reference value (reference value of the number of remaining contents), the stoppage determination execution unit 102 determines to stop the interaction. In a case where the number of remaining keys and the like are large, it is possible to determine that a large number of interactions, which are required for narrowing down the question sentences, are necessary. Accordingly, in the case, it is possible to reduce the number of interactions and to prevent the user from withdrawing by stopping the interaction.

In addition, in addition to the case where the number of remaining keys, the number of remaining question sentences, and the number of remaining answers are equal to or larger than the prescribed value, in a case where the reduction ratio or the number of reductions is equal to or smaller than the prescribed value, compared to the number of last remaining keys, the number of remaining question sentences, and the number of remaining answers, it may be determined to stop the interaction after all. A reason for this is that it is possible to determine that there is less room to efficiently narrow down the question sentences.

Note that, it may be determined that a priority is given to either the number of remaining question sentences or the number of remaining answers. For example, even in a case where the number of reductions or the reduction ratio in the number of remaining question sentences is equal to or larger than the prescribed value, it may be determined that it is not possible to narrow down in a case where the number of reductions or the reduction rate of the number of remaining answers is smaller than the prescribed value and fluctuation does not occur. In this case, it is preferable to stop the interaction.

(Change in Stop Reference)

As described above, the interaction may be stopped immediately in a case where an interaction stoppage condition is satisfied. However, the present invention is not limited thereto, and a process of loosening the interaction stoppage condition (for example, adjusting the reference value of the stoppage condition) may be performed in order to end the interaction early. Hereinafter, a specific example will be described.

The stoppage determination execution unit 102 may change a reference for determining stop based on a granularity or a frequency of the input content input to the input acquisition unit 101. In a case where the search starts, the user inputs a search sentence as the input key. However, the reference value for stopping the interaction may be adjusted according to a granularity of the search sentence. For example, there is a case where the interaction is stopped according to the number of continuations of the NO key. However, the reference value of the number of continuations may be set to be higher than the normal time. Therefore, even in a case where the number of NO keys is larger than the normal time, it is difficult to stop the interaction.

The granularity of the search sentence is a ratio of the number of input texts of a key input as the input key, the number of texts of a key (so-called an important phrase) registered in the FAQ database 107 among the input keys, or the number of texts of the key registered in the FAQ database 107 with respect to the search sentence (input key). In a case where the search sentence includes a long sentence (equal to or larger than a prescribed number of texts) or the important phase having the prescribed number of texts, it is considered that there is a low possibility of stopping the search in the middle. Accordingly, in this case, the reference value for stopping the interaction is set to a high value (reference value which is higher than the normal time).

Note that, in the FAQ database 107, a setting of whether or not the important phase is performed according to the key, and the stoppage determination execution unit 102 changes the reference for stoppage determination based on the number of texts of the key set in the important phase or a ratio of the key of the important phase to the whole.

In addition, the server 100 stores a search frequency for each user, and sets the reference value for stopping the interaction to a higher value than the normal time such that the interaction does not end early according to the frequency. A reason for this is that there is a low possibility that the user who performs the search many times withdraws the interaction in the middle. In this case, it is necessary for the history database 106 to store a user ID, together.

In addition, in a case where the number of remaining keys, the number of remaining question sentences, and the number of remaining answers are equal to or larger than the reference value, it is determined to stop the interaction. However, as the process for stopping the interaction, the reference value for narrowing down to end the interaction early may be set to a smaller value than the normal time. Accordingly, it is possible to end the interaction early.

(Control for Stopping According to System State)

The stoppage determination execution unit 102 may refer to the system state database 109 to determine to stop the interaction or adjust a reference value for stopping the interaction. For example, the stoppage determination execution unit 102 performs a process for stopping the interaction early based on the number of simultaneous connections to the communication terminal 200 or the number of voice recognition cooperations, which are stored in the system state database 109. For example, the stoppage determination execution unit 102 performs a process for determining an upper-limit number of times of the interactions, adjusting the reference value, which becomes the stoppage condition for ending the interaction early, in addition to the process for immediately stopping the interaction.

In addition, the stoppage determination execution unit 102 may adjust the reference value, which becomes the stoppage condition, based on a cooperation state with another system. In addition, in a case of any of a simultaneous connection state, the voice recognition process, and the cooperation with another system, a processing time of an entire system is calculated, and the control for stopping the interaction may be performed according to the processing time. For example, in a case where a total time from receiving the input key to transmitting the return key with respect to all users who are performing the search is equal to or longer than the prescribed time, the control for stopping the interaction may be performed. A reason for this is that a load is applied to the system, and thus time is required for the process.

(Other Stoppage Conditions)

The following conditions are further conceivable as conditions for stopping the interaction. That is, the stoppage determination execution unit 102 may determine an upper limit of the number of interactions and may stop the interaction in a case where the upper limit is reached. In addition, the interaction may be stopped based on an input rate of the user and a selection rate of either YES or NO. Note that, the input rate of the user does not indicate a rate at which a sentence for a separate search is input instead of an answer to the return key with YES/NO. The input is an input by a so-called free input. The number of inputs may be used instead of the input rate. Note that, although an example in which the input key is input only at the beginning of the search is illustrated in the above description, the input key may be input as a response to the return key.

In addition, the stoppage determination execution unit 102 may stop the interaction based on a lapse of time from the input of the input key or the lapsed time from a last response.

In addition, the stoppage determination execution unit 102 may stop the interaction in a case where a prescribed text, such as a magic word, is input by the user.

In addition, the stoppage determination execution unit 102 may adjust the reference value for stopping the interaction according to a time zone. For example, in a peak time zone for search, the reference value may be adjusted such that the interaction ends earlier in consideration of the system load. On the other hand, in time zones other than the peak time zone, the reference value may be adjusted such that the interaction does not end early.

In addition, the stoppage determination execution unit 102 may stop the interaction due to the existence of a similar key. For example, "do not send" and "cannot send" are semantically the same but do not match as texts. In a case where "do not send" is used as the input key, the stoppage determination execution unit 102 stops the interaction in a case where nothing matches in the FAQ database 107 but "cannot send" having similar meaning exists. Note that, the similar key is associated with the FAQ database 107.

Similarly, the stoppage determination execution unit 102 may also stop the interaction in a case where there is a key that is likely to be erroneously recognized.

Next, a change in a method of presenting the question sentence and the answer thereof will be described. It is conceivable that the method of presenting the answer is changed according to a state in which the interaction is stopped. For example, in a case where the interaction is stopped because the number of remaining answers or the number of remaining question sentences is equal to or larger than the reference value, the answer generation unit 103 presents all question sentences or answers extracted at the time point as question sentence can di dates.

In addition, the answer generation unit 103 may select a randomly selected question sentence and the answer thereof, and may select a question sentence including a larger number of keys (YES key) indicating the positive intention with respect to the return key.

In addition, the FAQ database 107 may hold a likelihood (similarity) between the question sentence and the search key, and the answer generation unit 103 may select the question sentence based on the likelihood. That is, the server 100 includes a management table that describes a plurality of questions and the likelihood of the search key for each question in association with each other, and the answer generation unit 103 may select the question sentence based on a total value of the likelihood of the search key that matches the input key and the return key (YES key). The likelihood of the search key is set to a different value for each question, and setting is performed such that, the larger the likelihood, the higher the possibility that the question is a question having content intended by the user.

In addition, a higher-ranked question or an answer may be selected using a usage frequency, which is selected as the question or the answer, as the reference.

In addition, the answer generation unit 103 may extract and present a prescribed specified abstract answer in a case of stopping the interaction by passing through a specific search path, for example, the search path in which there is a high tendency to withdraw. For example, in a case where, while the FAQ is being searched based on a key such as "send" or "error", the stoppage determination execution unit 102 stops the interaction because the search path in with a high tendency to withdraw is past, the answer generation unit 103 generates a specific answer page (a set of the question sentence candidates and answers thereof) such as "an answer page in which errors related to transmission are collected". That is, in a case where there is a specific key among the input keys or the return keys and the interaction stops, the answer generation unit 103 generates the answer page based on the specific key.

Further, an importance degree (category information or the like) is set for the key in the FAQ database 107, and the answer generation unit 103 may generate the answer based on the key having a high importance degree among the input keys and the return keys. For example, in a case where the interaction stops at xx of an invoice (xx: an issuance procedure, an issuance place, an issuable time, an entry description, and the like), the answer generation unit 103 generates the answer page in which an answer group related to the invoice is collected. Note that, the answer generation unit 103 may generate the answer page, or may guide the user by describing an access destination, such as a URL, on a previously prepared answer page.

In addition, in the case of stopping the interaction due to the existence of the similar key, a gist that the interaction is stopped due to the existence of the similar key may be presented, and a question sentence obtained using the similar key may be selected and presented to the user. In addition, in the case of stopping the interaction due to the presence of a key that is likely to be mistakenly recognized, a gist that the interaction is stopped may be presented, and a question sentence obtained using the key that is likely to be mistaken may be selected and presented to the user.

Next, an effect of the server 100 according to the embodiment of the present disclosure will be described. The server 100 is the interactive system that performs the interaction by performing a response to prompt an additional input of the user with respect to an input by the user and providing response content corresponding to the input of the user. The input acquisition unit 101 and the answer generation unit 103 constitute an interaction execution unit that repeatedly performs the interaction until a question sentence candidate, which is a response content candidate extracted before reaching the response content, and a relevant answer satisfy the prescribed condition. Further, the stoppage determination execution unit 102 performs control for stopping the interaction performed by the input acquisition unit 101 and the answer generation unit 103 based on the interaction state by the user or the other user. In a case where the interaction is stopped, the output unit 104 provides the question sentence and the answer thereof at the time of stoppage to the communication terminal 200.

Accordingly, it is possible to stop the interaction based on the interaction state by the user or the other user, and to present the answer at the time of stoppage to the user. Therefore, it is possible to reduce a possibility that the user withdraws the interaction in the middle. In the present embodiment, although the question sentence and the answer are described as the response content, only one of the question sentence and the answer may be used as the response content. In addition, there is an advantage in that it is possible to improve processing efficiency of the server 100. That is, since the interaction is not unnecessarily continued, a processing load of the server 100 is reduced, and, accordingly, it is possible to improve the processing efficiency for the interaction.

In the present embodiment, the interaction state includes a state in which the other user is performing the interaction in addition to a state in which one user is currently performing the interaction. In addition, the interaction state includes a system state or information on a search path in the past history. The system state is set based on the interaction state of the other user. In addition, the past history is set based on the past interaction state of one user or the other user.

The server 100 includes the interaction state database 105. The interaction state database 105 stores the interaction state currently executed by the user. The stoppage determination execution unit 102 stops the interaction based on the interaction state stored in the interaction state database 105.

Accordingly, it is possible to stop the interaction based on the interaction state currently executed by the user.

In addition, in the server 100, in a case where the stoppage determination execution unit 102 determines that a negative interaction is performed in the interaction state, the answer generation unit 103 stops the interaction without extracting the return key.

In a case where the negative intention (which may include the intention of skipping) with respect to the return key continues a prescribed number of times, there is a high possibility that the user withdraws the interaction for the search in the middle. Accordingly, in this case, it is preferable to stop the interaction in the middle.

In addition, the server 100 includes the history database 106. The history database 106 stores, as the interaction state, an interaction history in which the user or the other user interrupts the interaction. Further, the stoppage determination execution unit 102 stops the interaction in a case where the interaction state of the user, which is stored in the interaction state database 105, matches at least a part of the interaction history stored in the history database 106.

In a case where the same search path as the search path that is withdrawn in the middle of the interaction is past, it is considered that the withdrawal rate of the interaction of the user is high. Accordingly, in this case, the withdrawal of the user from the interaction is reduced by stopping the interaction.

In addition, the server 100 also includes the FAQ database 107 that stores the question sentence and the answer thereof, and the answer generation unit 103 extracts one or the plurality of question sentences from the FAQ database 107 whenever the interaction is performed. The stoppage determination execution unit 102 stops the interaction based on the number of remaining question sentences of the extracted question sentence (the number of remaining response contents).

Accordingly, in a case where it is not possible to narrow down the question sentences as in a case where the number of remaining question sentences does not decrease, it is possible to reduce the possibility that the user withdraws the interaction in the middle by stopping the interaction of the user.

In addition, in the server 100, in a case where the number of remaining question sentences of the extracted question sentences is compared with the number of last remaining question sentences and the reduction ratio or the number of reductions is equal to or smaller than the threshold, the stoppage determination execution unit 102 stops the interaction.

In a case where the reduction ratio of the number of remaining question sentences is small even after the interaction, there is a case where the user withdraws the interaction in the middle. Accordingly, in this case, it is possible to reduce the possibility that the interaction is withdrawn in the middle by stopping the interaction. Note that, the number of remaining answers may be used instead of the number of remaining question sentences. In addition, both may be used.

In addition, in the server 100, even in a case where the stoppage condition is satisfied, the stoppage determination execution unit 102 performs control for not stopping the interaction based on the granularity or the frequency of the input by the user. For example, the granularity of the input indicates whether or not the input key is a long sentence, and an interaction usage frequency of the user indicates the search frequency of the user. In this case, it is considered that there is a low possibility that the user withdraws the interaction in the middle and an intention to continue the interaction is high. In this case, control is performed such that the interaction is not stopped early by adjusting a stoppage determination reference in the normal time.

Regarding the granularity of the input, more specifically, the granularity of the input is indicated by the number of texts input by the user. Further, in a case where the stoppage condition is satisfied and the interaction is performed while a larger number of texts than the prescribed threshold are input by the user, the stoppage determination execution unit 102 adjusts the reference value of the stoppage condition in the normal time so as not to stop the interaction or so as not stop the interaction early.

In addition, the granularity of the input may be a ratio of the number of texts of the importance phase decided in advance or the key (corresponding to the important phase) registered in the FAQ database 107 among the number of texts of the key input by the user. In addition, the number of words may be used instead of the number of texts. That is, a ratio of the number of registered words to the number of input words may be used as a determination reference of the granularity of the input.

Further, the granularity of the input may be determined by a ratio of nouns or verbs among user input content, regardless of whether or not the input is registered in advance. For example, among the words input by the user, the ratio of nouns or verbs (or both nouns and the verbs) may be used as the granularity. In a case where morpheme analysis is performed on the user input content, it is possible to distinguish and extract the words (nouns, verbs, adjectives, or the like). Accordingly, in a case where a significant phase that is not registered in the FAQ database 107 or the like is input (for example, although WiFi is registered, the user inputs a wireless LAN), it is possible to perform control such that the granularity does not decrease. In addition, it is possible to judge the granularity based on a ratio of an interjection such as "Etto ("let me see" in Japanese)" to an insignificant phrase such as "Goodbye".

In addition, in the server 100, the stoppage determination execution unit 102 determines a state of the interactive system. The stoppage determination execution unit 102 performs control for stopping the interaction based on a determination result. The state of the interactive system indicates, for example, the number of simultaneous connections, the voice recognition cooperation process, and the like, and is information indicating the loads of the system.

In the server 100, the stoppage determination execution unit 102 includes, as the control for stopping the interaction, control for stopping the interaction by reducing the number of interactions than the normal time, and includes a process of adjusting the reference value indicating the stoppage condition in the normal time.

In addition, in the server 100, the answer generation unit 103 presents the answer by changing an answer presentation method according to the interaction state when the interaction is stopped by the stoppage determination execution unit 102.

The block diagram used for the description of the embodiment shows blocks in functional units. The functional blocks (components) are realized by a random combination of hardware and/or software. In addition, means for implementing each functional block is not particularly limited. That is, each functional block may be realized by one device physically and/or logically coupled, or may be realized by a plurality of devices by directly and/or indirectly (for example, wired and/or wireless) connecting two or more devices which are physically and/or logically separated from each other.

Figure 6:
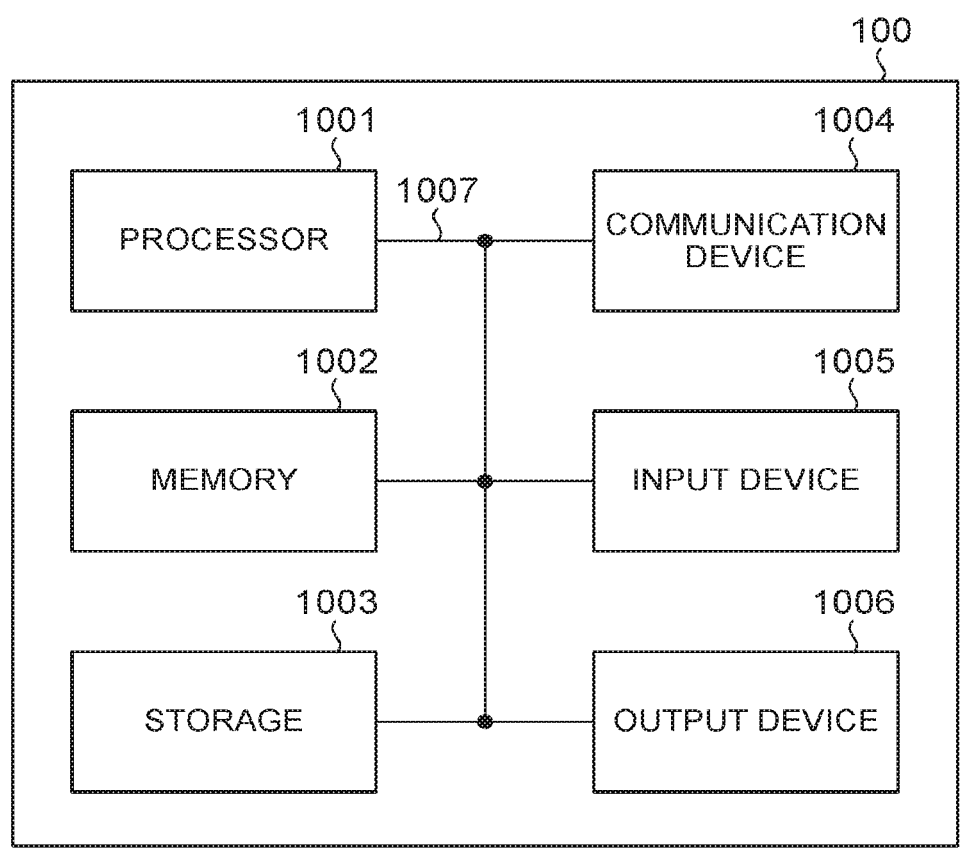
FIG. 6 is a diagram illustrating an example of a hardware configuration of the server 100 and a communication terminal 200 according to the embodiment of the present disclosure.

For example, the server 100 and the communication terminal 200 according to the embodiment of the present disclosure may function as a computer that performs the processes of the server 100 and the communication terminal 200 of the embodiment. FIG. 6 is a diagram illustrating an example of a hardware configuration of the server 100 and the communication terminal 200 according to the present embodiment. The server 100 and the communication terminal 200 described above may be physically configured as a computer device including a processor 1001, a memory 1002, a storage 1003, a communication device 1004, an input device 1005, an output device 1006, a bus 1007, and the like.

Note that, in the following description, it is possible to replace a term "device" as a circuit, a device, a unit, or the like. The hardware configuration of the server 100 and the communication terminal 200 may be configured to include one or a plurality of devices illustrated in the drawing, or may be configured without including some devices.

Each function of the server 100 and the communication terminal 200 is realized in such a way that the processor 1001 performs an arithmetic operation by reading prescribed software (program) on hardware such as the processor 1001 or the memory 1002, and is realized by controlling communication by the communication device 1004 or data reading and/or writing in the memory 1002 and the storage 1003.

The processor 1001 controls the entire computer by operating, for example, an operating system. The processor 1001 may be configured by a Central Processing Unit (CPU) including an interface with a peripheral device, a control device, an arithmetic device, a register, and the like. For example, the stoppage determination execution unit 102, the answer generation unit 103, and the like may be realized by the processor 1001.

In addition, the processor 1001 reads a program (program code), a software module, and data from the storage 1003 and/or the communication device 1004 to the memory 1002, and executes various processes according to the program. As the program, a program is used that causes a computer to execute at least a part of the operation described in the above embodiment. For example, the stoppage determination execution unit 102 and the answer generation unit 103 may be stored in the memory 1002 and may be realized by the control program operated by the processor 1001, and other functional blocks may be realized similarly. Although a gist that the-above described various processes are executed by one processor 1001 is described, the processes may be executed simultaneously or sequentially by two or more processors 1001. The processor 1001 may be implemented with one or more chips. Note that, the program may be transmitted from a network through an electric telecommunication line.

The memory 1002 is a computer-readable recording medium, and may be configured by at least one of a Read Only Memory (ROM), an Erasable Programmable ROM (EPROM), an Electrically Erasable Programmable ROM (EEPROM), and a Random Access Memory (RAM). The memory 1002 may be called a register, a cache, a main memory (main storage device), or the like. The memory 1002 can preserve the program (program code), the software module, and the like that can be executed to perform the wireless communication method according to one embodiment of the present invention.

The storage 1003 is a computer-readable recording medium, and may be configured by, for example, at least one of an optical disk such as a Compact Disc (CD)-ROM, a hard disk drive, a flexible disk, a magneto-optical disk (for example, a compact disk, a digital versatile disk, a Blu-ray (Registered trademark) disk), a smart card, a flash memory (for example, a card, a stick, or a key drive), a floppy (registered trademark) disk, and a magnetic strip. The storage 1003 may be called an auxiliary storage device. The above-described storage medium may be, for example, a database including the memory 1002 and/or the storage 1003, a server, or another suitable medium.

The communication device 1004 is hardware (transmission/reception device) for performing communication between the computers through a wired and/or wireless network, and is also referred to as, for example, a network device, a network controller, a network card, a communication module, or the like. For example, the above-described input acquisition unit 101 and the output unit 104 may be realized by the communication device 1004.

The input device 1005 is an input device (for example, a keyboard, a mouse, a microphone, a switch, a button, a sensor, or the like) that receives an input from an outside. The output device 1006 is an output device (for example, a display, a speaker, an LED lamp, or the like) that performs output to the outside. Note that, the input device 1005 and the output device 1006 may have an integrated configuration (for example, a touch panel).

In addition, each device, such as the processor 1001 or the memory 1002, is connected by a bus 1007 for communicating information. The bus 1007 may be configured by a single bus, or may be configured by different buses between the devices.

In addition, the server 100 and the communication terminal 200 may be configured to include hardware, such as a microprocessor, a Digital Signal Processor (DSP), an Application Specific Integrated Circuit (ASIC), a Programmable Logic Device (PLD), or a Field Programmable Gate Array (FPGA). Some or all of the functional blocks may be realized by the hardware. For example, the processor 1001 may be implemented by at least one of the hardware.

Hereinabove, although the embodiment is described in detail, for those skilled in the art, it is apparent that the embodiment is not limited to the embodiment described in the specification. It is possible to realize the embodiment as a modified aspect and a changed aspect without departing from the gist and the scope of the present invention defined by the description of the claims. Therefore, the description of the specification has a purpose for exemplary description, and does not have any restrictive meaning with respect to the present embodiment.

Each aspect/embodiment described in the specification may be applied to a system using Long Term Evolution (LTE), LTE-Advanced (LTE-A), SUPER 3G, IMT-Advanced, 4G, 5G, Future Radio Access (FRA), W-CDMA (Registered trademark), GSM (registered trademark), CDMA2000, Ultra Mobile Broadband (UMB), IEEE 802.11 (Wi-Fi), IEEE 802.16 (WiMAX), IEEE 802.20, UWB (Ultra-Wide Band), Bluetooth (registered trademark), a system using another appropriate system, and/or a next-generation system extended based on the above system.

Processing procedures, sequences, flowcharts, or the like of each aspect/embodiment described in the specification may change orders as long as there is no inconsistency. For example, for the method described in the specification, elements of various steps are presented in an exemplary order, and the order is not limited to the presented specific order.

The information or the like may be output from an upper layer (or lower layer) to a lower layer (or upper layer). The information and the like may be input and output through a plurality of network nodes.

The input and output information or the like may be preserved in a specific location (for example, a memory) or may be managed using a management table. The input and output information or the like may be overwritten, updated, or added. The output information or the like may be deleted. The input information or the like may be transmitted to another device.

The judgement may be performed using a value represented by 1 bit (0 or 1), may be performed using a truth value (Boolean: true or false), or may be performed through comparison with numerical values (for example, comparison with a prescribed value).

Each aspect/embodiment described in the specification may be used alone, may be used in combination, or may be switched according to the execution. In addition, a notification of prescribed information (for example, notification of "X") is not limited to being explicitly performed, and may be performed implicitly (for example, the notification of the prescribed information is not performed).

Regardless of being called software, firmware, middleware, microcode, a hardware description language, or another name, the software should be widely interpreted to mean an instruction, an instruction set, a codes, a code segment, a program code, a program, a subprogram, a software module, an application, a software application, a software package, a routine, a subroutine, an object, an executable file, an execution thread, a procedure, a function, and the like.

In addition, the software, the instructions, and the like may be transmitted and received through a transmission medium. For example, in a case where the software is transmitted from a website, a server, or another remote source using a wired technology, such as a coaxial cable, a fiber optic cable, a twisted pair and Digital Subscriber Line (DSL), and/or a wireless technology, such as infrared, wireless, or microwave, the wired and/or wireless technologies are included in a definition of the transmission medium.

The information, signals, and the like described in the specification may be represented using any of a variety of different technologies. For example, data, instructions, commands, information, signals, bits, symbols, chips, or the like, which may be referred to throughout the above description, may be represented using voltages, currents, electromagnetic waves, magnetic fields or magnetic particles, photo fields or photons, or a random combination thereof.

Note that, terms described in the specification and/or terms necessary for understanding the specification may be replaced with terms having the same or similar meanings. The terms "system" and "network" used in the specification are used interchangeably.

In addition, information, parameters, and the like described in the specification may be represented by absolute values, may be represented by relative values from the prescribed values, or may be represented by another relevant information. For example, a radio resource may be indicated by an index.

The names used for the above-described parameters are not limited at any point. Further, there is a case in which formulas and the like that use the parameters are differ from those explicitly disclosed in the specification. Various channels (for example, PUCCH, PDCCH, and the like) and information elements (for example, TPC and the like) are capable of being identified by any ideal names, and thus the various names assigned to the various channels and the information elements are not limited at any point.

There is a case where the terms "determining" and "deciding" used in the specification include a wide variety of operations. The "determining" and the "deciding" may include, for example, judging, calculating, computing, processing, deriving, investigating, searching (for example, searching in a table, a database or another data structure), and regarding the checking as being "determined" and "decided". In addition, the "determining" and the "deciding" may include regarding receiving (for example, receiving information), transmitting (for example, transmitting information), inputting, outputting, and accessing (for example, accessing data in a memory) as being "determined" or "decided". In addition, the "determining" and the "deciding" may include regarding resolving, selecting, choosing, establishing, comparing, and the like as being "determined" or "decided". That is, the "determining" and the "deciding" may include regarding that any operation is "determined" or "decided".

The terms "connected" and "coupled" or various variations thereof mean various direct or indirect connection or coupling between two or more elements, and it is possible to include presence of one or more intermediate elements between two elements which are "connected" or "coupled" to each other. The coupling or connection between the elements may be physical, logical, or a combination thereof. In a case of usage in the specification, it can be considered that two elements are "connected" or "coupled" to each other by using one or more electrical wires, cables and/or printed electrical connections and by using electromagnetic energy, such as electromagnetic energy having wavelengths in a wireless frequency region, a microwave region, and light (both visible and invisible) region as some non-limiting and non-exhaustive examples.

A description "based on" used in the specification does not mean "based only on" unless otherwise specified. In other words, the description "based on" means both "based only on" and "based at least on".

As long as "include", "including", and variations thereof are used in the specification or claims, the terms are intended to be comprehensive, similar to a term "comprising". Further, it is intended that a term "or" used in the specification or the claims is not an exclusive OR.

In the specification, a plurality of devices are also included unless only one device is clearly exists in context or technically.

Throughout the disclosure, unless a singular element is clearly dictated from the context, it is assumed that a plurality of elements are included.

REFERENCE SIGNS LIST

100: server
101: input acquisition unit
102: stoppage determination execution unit
103: answer generation unit
104: output unit
105: interaction state database
106: history database
107: FAQ database
108: system management unit
109: system state database
200: communication terminal

The invention claimed is:

1. An interactive system that performs an interaction by performing a response to prompt an additional input of a user with respect to an input by the user and providing a response content, the interactive system comprising:
   circuitry configured to
      repeatedly perform the interaction until a response content candidate, which is a candidate for the response content, satisfies a prescribed condition;
      perform control for stopping the interaction based on an interaction state by the user or another user;
      provide the response content according to a time of stoppage in a case where the control for stopping the interaction is performed; and
      store the interaction state with the user,
   wherein the circuitry performs the control for stopping the interaction based on the stored interaction state, and based on a case where it is determined that a negative interaction is performed in the interaction state.

2. The interactive system according to claim 1,
   wherein the circuitry performs control for not stopping the interaction based on a granularity of the input by the user or an interaction usage frequency of the user.

3. The interactive system according to claim 2,
   wherein the granularity of the input is represented by a number of texts input by the user or a ratio of the number of texts of a predetermined important phrase previously decided in the number of the input texts, and
   wherein the circuitry performs the control for not stopping the interaction in a case where an interaction, in which the number of texts larger than a prescribed threshold is input by the user, is performed or in a case where an interaction, in which the ratio of the number of texts of the predetermined important phrase is equal to or larger than a prescribed value, is performed.

4. The interactive system according to claim 1,
   wherein the circuitry
      stores a state of the interactive system as the interaction state, and
      performs the control for stopping the interaction based on the stored state of the interactive system.

5. The interactive system according to claim 4,
   wherein the state of the interactive system indicates whether or not a prescribed load is applied to the interaction with the user.

6. The interactive system according to claim 1,
   wherein the circuitry adjusts a reference value indicating a condition for stopping the interaction as the control for stopping the interaction.

7. The interactive system according to claim 1,
   wherein the circuitry presents the response content by changing a response content presentation method according to the interaction state when the interaction is stopped.

8. The interactive system according to claim 3,
   wherein the processing circuitry stores an interaction history, in which the user or the another user interrupts the interaction, as the interaction state, and
   wherein the control for stopping the interaction is performed in a case where at least a part of the stored interaction state with the user, matches the stored interaction history.

9. An interactive system that performs an interaction by performing a response to prompt an additional input of a user with respect to an input by the user and providing a response content, the interactive system comprising:
   circuitry configured to
      repeatedly perform the interaction until a response content candidate, which is a candidate for the response content, satisfies a prescribed condition;

perform control for stopping the interaction based on an interaction state by the user or another user;
provide the response content according to a time of stoppage in a case where the control for stopping the interaction is performed; and
store the interaction state with the user,
wherein
the circuitry performs the control for stopping the interaction based on the stored interaction state,
the circuitry stores an interaction history, in which the user or the another user interrupts the interaction, as the interaction state, and
the control for stopping the interaction is performed in a case where at least a part of the stored interaction state with the user matches the stored interaction history.

10. The interactive system according to claim 9, wherein the circuitry performs control for not stopping the interaction based on a granularity of the input by the user or an interaction usage frequency of the user.

11. The interactive system according to claim 10, wherein the granularity of the input is represented by a number of texts input by the user or a ratio of the number of texts of a predetermined important phrase previously decided in the number of the input texts, and
wherein the circuitry performs the control for not stopping the interaction in a case where an interaction, in which the number of texts larger than a prescribed threshold is input by the user, is performed or in a case where an interaction, in which the ratio of the number of texts of the predetermined important phrase is equal to or larger than a prescribed value, is performed.

12. The interactive system according to claim 9, wherein the circuitry
stores a state of the interactive system as the interaction state, and
performs the control for stopping the interaction based on the stored state of the interactive system.

13. The interactive system according to claim 12, wherein the state of the interactive system indicates whether or not a prescribed load is applied to the interaction with the user.

14. The interactive system according to claim 9, wherein the circuitry adjusts a reference value indicating a condition for stopping the interaction as the control for stopping the interaction.

15. The interactive system according to claim 9, wherein the circuitry presents the response content by changing a response content presentation method according to the interaction state when the interaction is stopped.

16. An interactive system that performs an interaction by performing a response to prompt an additional input of a user with respect to an input by the user and providing a response content, the interactive system comprising:
circuitry configured to
repeatedly perform the interaction until a response content candidate, which is a candidate for the response content, satisfies a prescribed condition;
perform control for stopping the interaction based on an interaction state by the user or another user;
provide the response content according to a time of stoppage in a case where the control for stopping the interaction is performed;
store the response content;
extract one or a plurality of the stored response contents whenever the interaction is performed; and
compare a number of remaining response contents with a number of remaining last response contents, and perform the control for stopping the interaction in a case where a reduction ratio or a number of reductions is equal to or smaller than a threshold.

17. The interactive system according to claim 16, wherein the circuitry performs control for not stopping the interaction by an interaction execution unit based on a granularity of the input by the user or an interaction usage frequency of the user.

18. The interactive system according to claim 17, wherein the granularity of the input is represented by a number of texts input by the user or a ratio of the number of texts of a predetermined important phrase previously decided in the number of the input texts, and
wherein the circuitry performs the control for not stopping the interaction in a case where an interaction, in which the number of texts larger than a prescribed threshold is input by the user, is performed or in a case where an interaction, in which the ratio of the number of texts of the predetermined important phrase is equal to or larger than a prescribed value, is performed.

19. The interactive system according to claim 16, wherein the circuitry
stores a state of the interactive system as the interaction state, and
performs the control for stopping the interaction based on the stored state of the interactive system.

20. The interactive system according to claim 19, wherein the state of the interactive system indicates whether or not a prescribed load is applied to the interaction with the user.

* * * * *